Patented Oct. 29, 1946

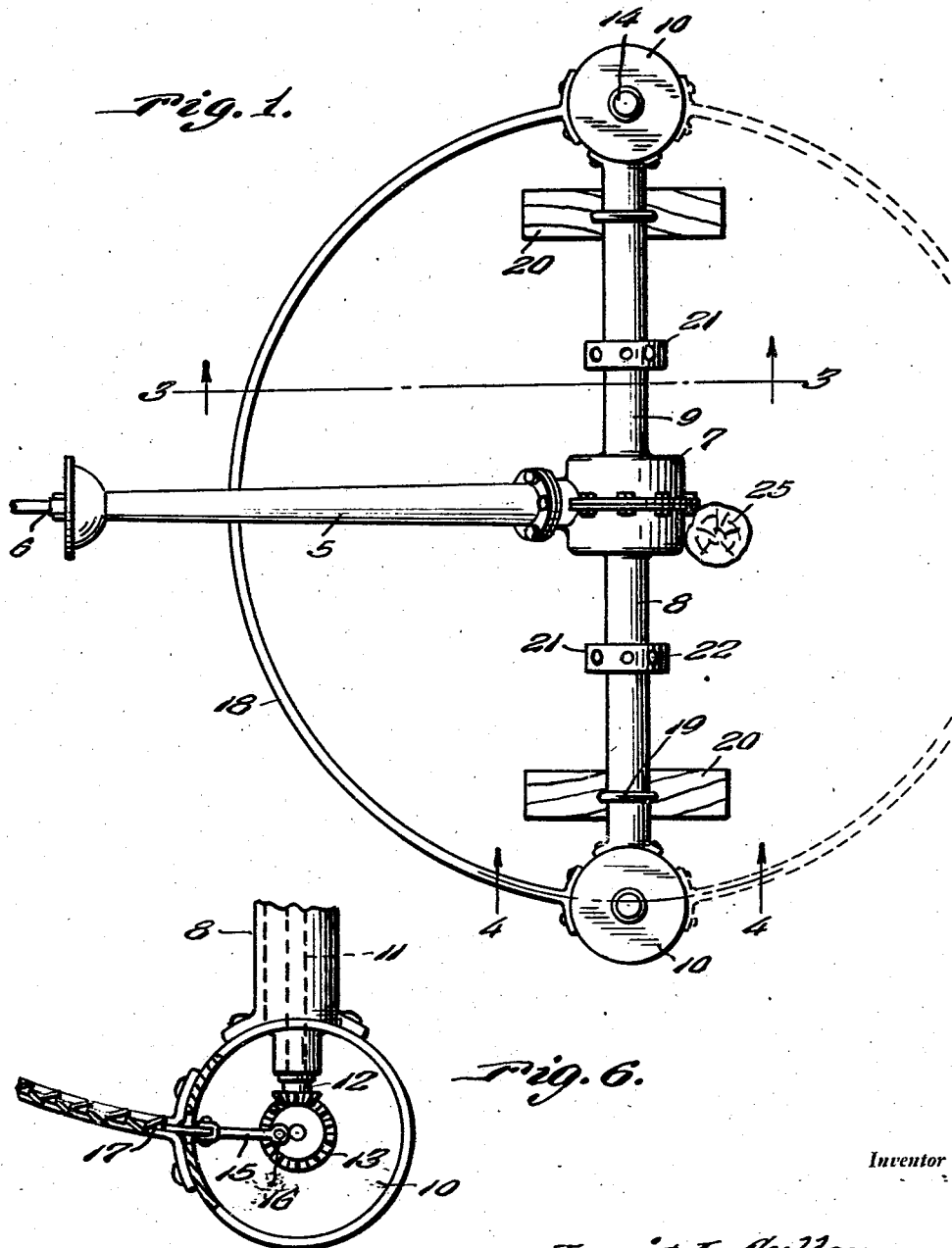

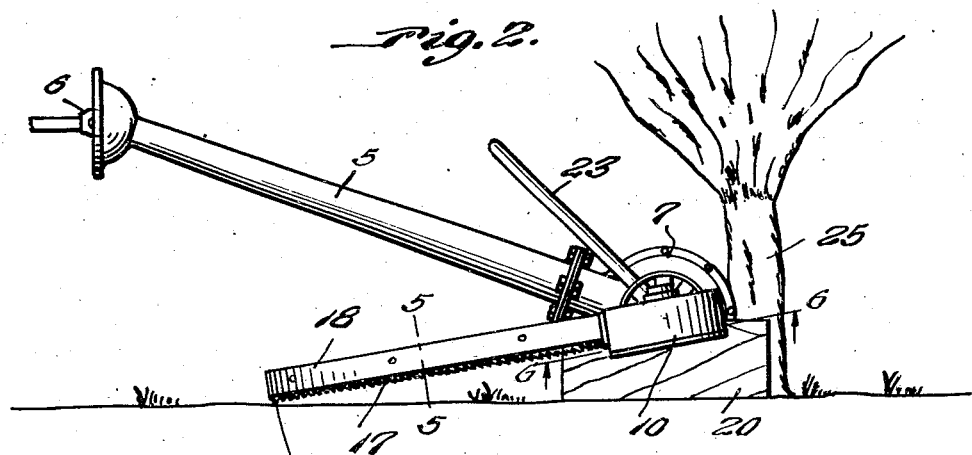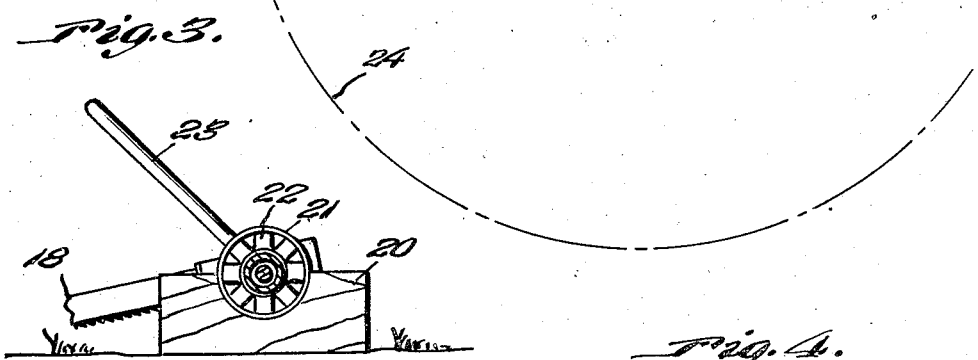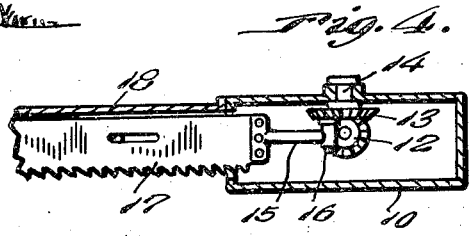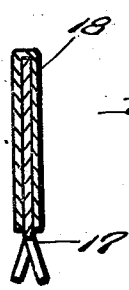

2,410,203

UNITED STATES PATENT OFFICE 2,410,203

TREE TRANSPLANTING APPARATUS

Lewis L. Culley, Jackson, Miss.

Application August 22, 1945, Serial No. 612,083

4 Claims. (Cl. 37—2)

1

The present invention relates to a new and useful improvement in apparatus for transplanting trees, shrubbery and the like, and more particularly to an apparatus for cutting the soil immediately adjacent and under the tree to facilitate lifting of the tree and roots thereof from the soil for transporting to its new location.

More specifically, the invention embodies the provision of a reciprocating band-saw supported in semi-circular form, together with means for forcing the saw downwardly through the earth and under the tree to separate the soil in the region of the roots thereof while maintaining the roots embedded in a severed portion of the soil.

A further object of the invention is to provide an apparatus of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a top plan view,

Figure 2 is a side elevational view,

Figure 3 is a transverse sectional view taken substantially on a line 3—3 of Figure 1, Figure 4 is a fragmentary sectional view through the gear housing at one end of the saw, Figure 5 is a transverse sectional view of the saw and saw guide taken substantially on a line 5—5 of Figure 2, and Figure 6 is a sectional view taken substantially on a line 6—6 of Figure 2.

Referring now to the drawings in detail, wherein, for the purpose of illustration, I have disclosed a preferred embodiment of the invention, the numeral 5 designates the housing for a drive shaft 6 adapted for connection with a conventional form of power takeoff from a tractor or other suitable source of power (not shown).

To the rear end of the housing 5 is connected a differential gear housing 7, from the opposite sides of which shaft housings 8 and 9 project for rotation in the differential housing, the outer ends of the housings 8 and 9 having gear housings 10 secured thereto. Shafts 11 are journaled in the housings 8 and 9 for operation by the shaft 6 through a conventional form of differential gearing in the housing 7. To the outer end of each shaft 11 is secured a bevel gear 12 with which a similar gear 13 is engaged and journaled in the

2 top of the housing 10 by means of a sub-shaft 14.

A pitman rod 15 is pivotally connected at one end on a pin 16 carried eccentrically by the gear 13, and to the other end of the pitman rod 15 is attached one end of a band saw 17.

The rear edge of the band saw 17 is slidably mounted in an inverted channel-shaped guide 18 arranged in semi-circular form and having its ends attached to the gear housings 10 at the outer ends of the housings 8 and 9.

The shaft housings 8 and 9 are rotatably supported in bearings 19 on top of a pair of supporting blocks 20, and each of the housings 8 and 9 is provided with a collar 21 having radially extending openings 22 therein, and in which the end of a lever 23 is selectively inserted to rotate the housings 8 and 9 to swing the saw 17 and saw guide 18 downwardly in an arc, as shown by the dotted lines 24 in Figure 2 of the drawings, through the soil and under the roots of a tree 25.

The saw 17 is reciprocated by the shaft 6 through its connection at each end of the saw by means of the shaft 11, gears 12 and 13, and pitman 15, so that the saw continuously reciprocates as the same is forced downwardly through the earth by the rotation of the housings 8 and 9 by means of downward pressure exerted on the lever 23.

Accordingly, a semi-circular section of the earth is removed immediately adjacent and under the tree 25 and in which the roots of the tree are left embedded so that the tree and the severed segment of the earth may be conveniently removed and transplanted without exposing the roots.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claims.

What is claimed is:

1. A tree transplanting device comprising an arcuate cutter, means for reciprocating the cutter, and means for moving the cutter through the earth under a standing tree to sever a portion of the earth of semi-spherical form for removal with the tree.

2. A tree transplanting device comprising a saw blade, means connecting the ends of the saw in semi-circular form, means for reciprocating the saw, and means for swinging the saw downwardly through the earth and under a standing tree to sever a segment of earth immediately adjacent the tree for removal with the tree.

3. A tree transplanting device comprising a power driven shaft, a pair of shafts operatively connected to one end thereof and extending at right angles thereto in opposite directions, shaft housings for each of said pair of shafts, a gear housing at the outer ends of said shaft housings, a semi-circular saw blade, means operatively connecting the ends of the saw to the outer ends of said pair of shafts for reciprocating the saw, and means for rotating the housings on the pair of shafts to swing the saw downwardly through the earth and under a standing tree.

4. A tree transplanting device comprising a power driven shaft, a pair of shafts operatively connected to one end thereof and extending at right angles thereto in opposite directions, shaft housings for each of said pair of shafts, a gear housing at the outer ends of said shaft housings, a semi-circular saw blade, means operatively connecting the ends of the saw to the outer ends of said pair of shafts for reciprocating the saw, a guard for the back of the saw connected to said gear housings, a capstan operating means on at least one shaft housing for rotating the latter to swing the saw downwardly through the earth and under a standing tree.

LEWIS L. CULLEY.